Figure 1:
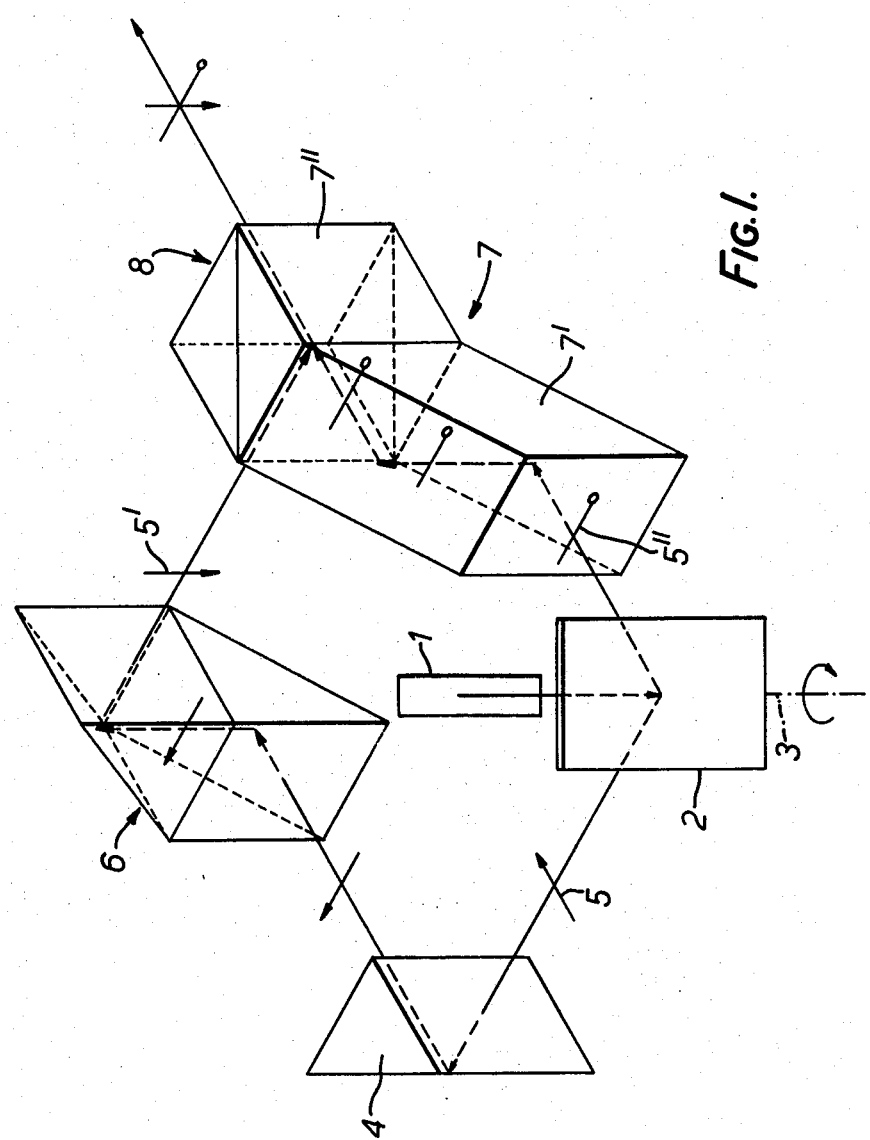

United States Patent [19]

Auterson

[11] 4,348,109

[45] Sep. 7, 1982

[54] SIGHTS

[75] Inventor: James Auterson, Leicester, England

[73] Assignee: The Marconi Company Limited, Chelmsford, England

[21] Appl. No.: 198,268

[22] Filed: Oct. 17, 1980

[30] Foreign Application Priority Data

Oct. 19, 1979 [GB] United Kingdom ............... 7936271

[51] Int. Cl.³ .............................................. G02B 23/10
[52] U.S. Cl. .................................. 356/252; 340/757; 350/6.91
[58] Field of Search ............... 356/251, 252; 350/6.91, 350/174; 340/705, 754, 755, 757, 762

[56] References Cited

U.S. PATENT DOCUMENTS 3,885,861  5/1975  Farnsworth et al. ............ 356/252 X
3,951,553  4/1976  Oberheuser ....................... 356/251

FOREIGN PATENT DOCUMENTS 1496155  12/1977  United Kingdom ................ 356/252

OTHER PUBLICATIONS

Fan et al., "Scrolling of Rotating Scanner-LED (ROLED) Displays", IBM Tech. Discl. Bull., vol. 20, No. 1, pp. 405-406, 6/77.

Primary Examiner—John K. Corbin
Assistant Examiner—Matthew W. Koren
Attorney, Agent, or Firm—Spencer & Kaye

[57] ABSTRACT

The invention provides a gun sight into which an aiming mark in the form of a cross is introduced. A rotatable reflector scanning an LED array directs an image of the array first towards one light transmission system and then towards another during the course of rotation. The image travelling through one system is rotated relative to the image travelling through the other system and the two images are combined. Control means are provided selectively to energize individual ones of the LED's so that the effect of combining the two images is a cross the center of which can be chosen by controlling which of the LED's is energized different times.

10 Claims, 5 Drawing Figures

SIGHTS

This invention relates to sights and in particular to sights such as certain forms of gun sights used for fire control systems where an aiming mark in the form of a cross is introduced in the field of view of the operator.

In fire control systems as at present known one method of producing an aiming mark as described above is to use a miniature cathode array display tube upon the face of which a cross is displayed in an appropriate position and the display from which is arranged to overlay the field of view of the gunner. The use of a cathode ray tube, however, is undesirable from a number of points of view. The life of its phosphor tends to be limited and the high voltage required to drive the tube and the need periodically to zero the reflection amplifiers which drive the display are onerous requirements.

It has been proposed to produce a matrix of LED devices capable of producing a high brightness display which can replace the cathode ray tube. However, using a matrix of LED devices in this manner the resolution which is obtainable is insufficiently high for many purposes and in particular for producing aiming marks for a gunner in a fire control system.

A further development based upon the use of LED's provides a vertical line of LED's one of which is illuminated to produce a point aiming mark providing the vertical co-ordinate of the aiming point whilst horizontal deflection is provided by a mark driven by a precision servo mechanism to take into account the horizontal co-ordinate of the main mark. However this system has proved to be mechanically undesirably complex.

One object of the present invention is to provide an improved system comprising a sight in to the field of view of which an aiming mark in the form of a cross is injected, utilising LED or like light sources without involving unduly complicated mechanical systems.

According to this invention a system comprising a sight into the field of which a position indicating mark in the form of a cross is required to be injected and wherein the means for generating said mark comprises a linear array of light sources, reflector means rotatable about an axis and arranged to reflect an image of said array in the course of rotation towards a first light transmissive member and thereafter towards a second light transmissive member such that said image scans across the field of each light transmissive member in turn, means for relatively rotating the image passing through one light transmissive member relative to the image passing through the other light transmissive members, means for optically combining the output of the two light transmissive members and means for selectively energising individual ones of said light sources whereby said optical combining means produces a mark consisting of two crossing strokes the first of which is derived from the image of an illuminated light source scanned across the field of said first light transmissive member and the other of which is derived from the image of a light source scanned across the field of said second light transmissive member.

Preferably said means for relatively rotating the image passing through one light transmissive member relative to the image passing through the other light transmissive member is such as to provide a relative rotation of 90° whereby said two strokes produced by said optical combining means cross each other at right angles.

Normally the axis of rotation of said reflector means is parallel to the direction of extension of said linear array of light sources.

Preferably said first light transmissive member comprises a right-angled prism arranged to direct light from said reflector means to an optical system consisting of two right-angled prisms with their reflective surfaces perpendicular which both effect said reflective rotation of 90° and directs light on to said optical combining means.

Preferably again said second light transmissive member comprises a rhomboid prism the output face of which is in contact with a cubical light transmissive member acting as said optical combining means.

Preferably means are provided for selectively energising a number of light sources in said array during the time when said image is scanned across the field of said first light transmissive member and for selectively energising a number of said individual light sources during the time when said image is scanned across the field of said second light transmissive member.

Preferably said last mentioned number is in each case one only at any one time. Preferably the arrangement is such that one light source may be energised during the time when said image is scanned across the field of said first light transmissive member and a different light source may be energised during the time when said image scans across the field of said second light transmissive member whereby the crossing point of the mark produced by said optical combining means may be controlled as to its position within the field of said last mentioned means.

Preferably said light sources are LED's (light emitting diodes).

Said rotatable reflector means preferably comprises a double-sided mirror.

The invention is illustrated in and further described with reference to the accompanying drawings in which, FIG. 1 illustrates the lay-out and nature of the optical components of one system in accordance with the present invention for producing an aiming mark in the form of a cross which may be injected into the field of view of a gunner in a fire control system.

Figure 2:
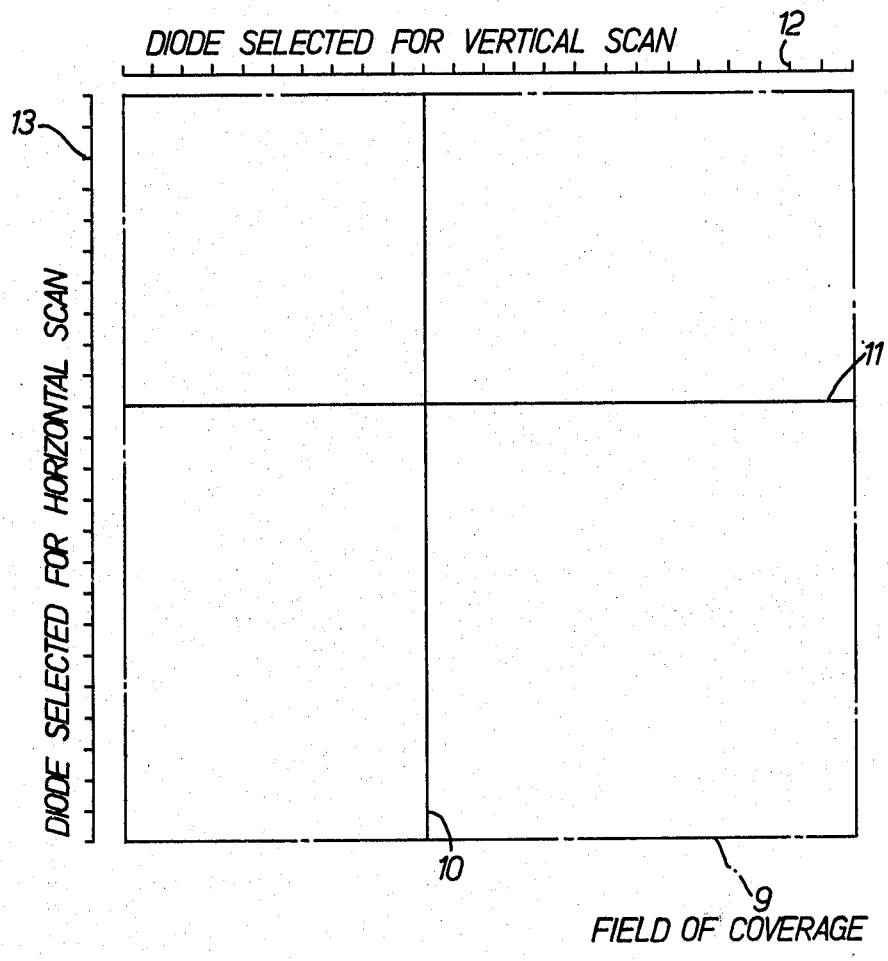
Figure 3:
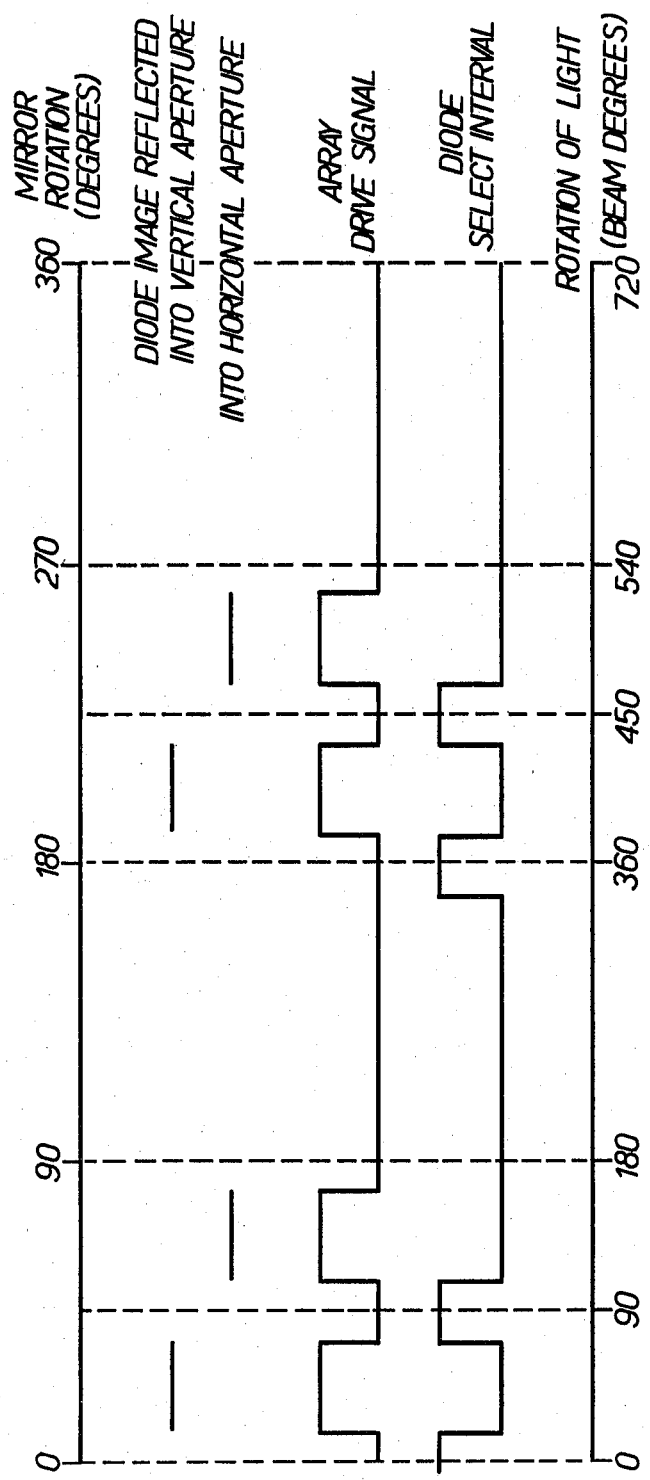
Figure 4:
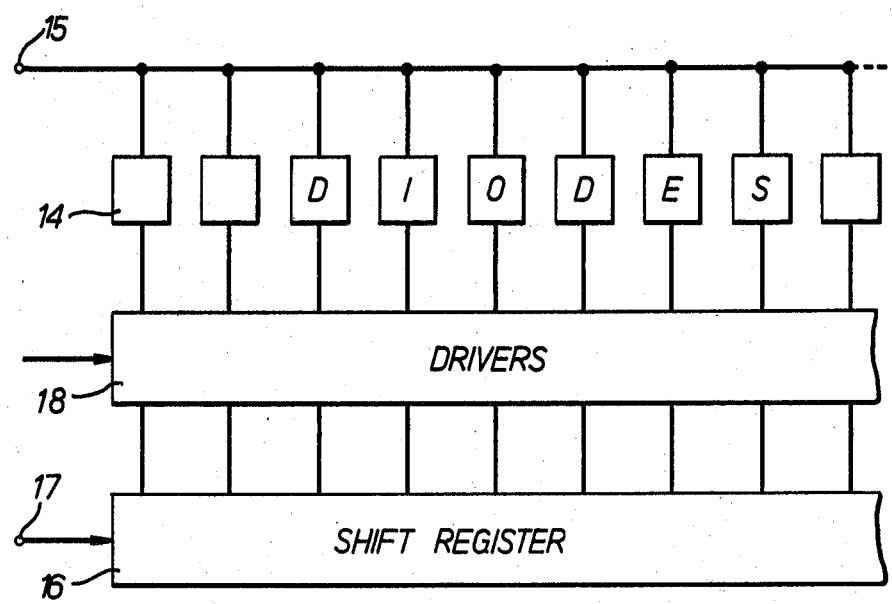
Figure 5:
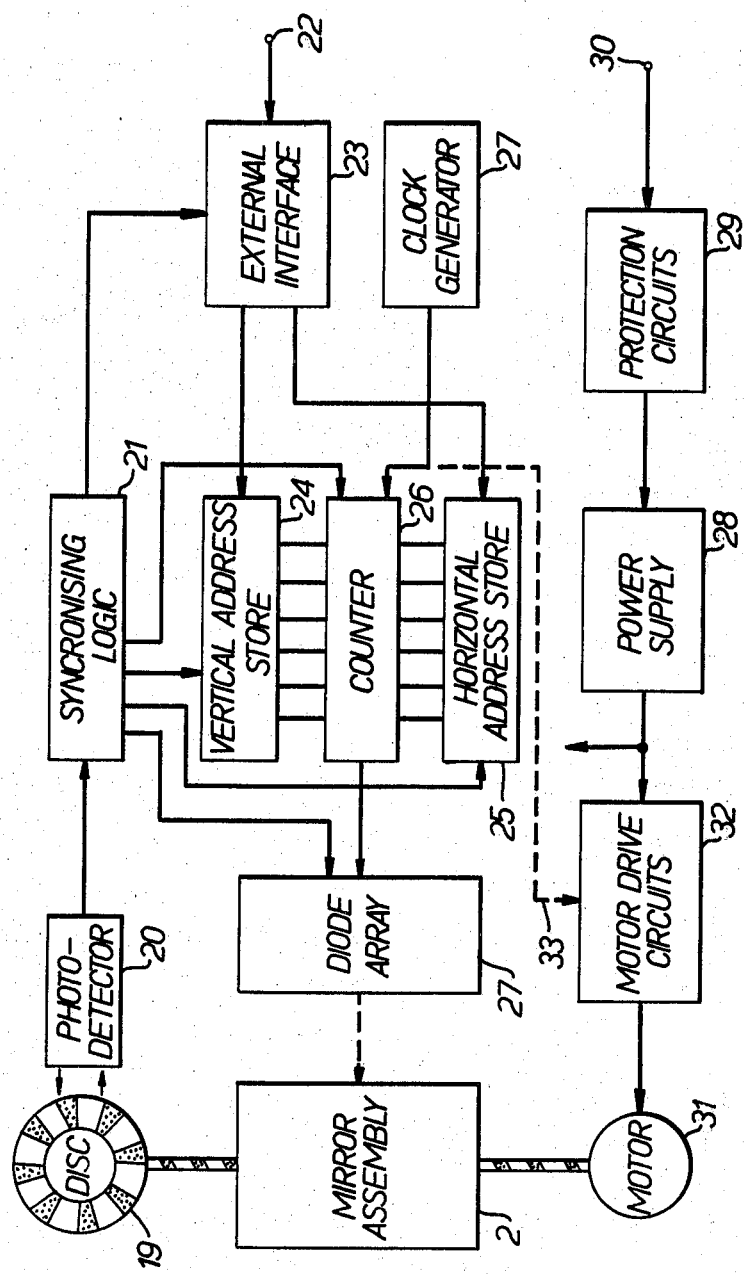

FIG. 2 is an explanatory diagram relating to the operation of the system described with reference to FIG. 1, FIG. 3 is a timing diagram relating to the operation of the system described with reference to FIGS. 1 and 2, FIG. 4 diagrammatically illustrates the composition of the diode array referenced 1 in FIG. 1 and FIG. 5 is a block schematic diagram of an electronic control system used in the system described with reference to FIGS. 1 to 4.

In the figures like references denote like parts.

Referring to FIG. 1, a horizontally extending linear array of LED's (light emitting diodes) is represented at 1. A two-sided mirror 2, is mounted to be rotated about a horizontal axis 3 which axis 3 is parallel to the line of LED's in the array 1.

A right-angled prism 4 is positioned such that as doubled-sided mirror 2 is rotated about axis 3 an image of the LED array 1 is scanned horizontally across the input face of prism 4. Thus if one of the LED's is illuminated a straight horizontal line will be drawn across the input face of the right-angled prism 4 as represented by the arrow 5.

Positioned to receive light output from the right-angled prism 4 is a prism system 6 consisting of two right-angled prisms with their reflecting surfaces perpendicular (effectively forming half a Porro prism of the second kind). The effect of the prism system 6 is to rotate by 90° the light output from right-angled prism 4 so that the aforementioned horizontal line drawn across the input face of right-angled prism 4 is translated at the output of the prism system 6 into a vertical line 5'.

The output of prism system 6 is applied to an optical combining arrangement 7. Optical combining arrangement 7 consists of the combination of a rhomboid prism 7' and a combiner 7''.

As the double-sided mirror 2 is rotated, light from LED arrary 1 after being reflected onto the input face of right-angled prism 4 is subsequently reflected onto an input face of the rhomboid prism 7' forming part of optical combiner 7. If a diode in the LED array as aforementioned is illuminated whilst an image of the array 1 is swept across the input face of prism 7', the result will be the drawing of a horizontal line represented by line 5''.

The combined effect at the output 8 of the optical combiner 7'', due to persistance, is a cross of which the vertical stroke is formed by transmission around the path including right-angled prism 4 and prism system 6 and the horizontal stroke is formed as a result of an input via rhomboid prism 7' from the doubled-sided mirror 2.

The centre of the cross will be determined by which of the diodes in the LED array 1 is illuminated. If a diode in the middle of the array is illuminated throughout, the centre of the cross will be relatively at the centre of the field of the device. The centre of the cross will move up or down and left or right depending upon which of the other diodes on either side of the middle diode is illuminated.

If the diode in the array 1 which is illuminated is changed in the interval between the reflection of light by the mirror 2 into the input face of right angled prism 4 and the reflection of light from the mirror 2 onto the input face of the optical combiner 7', the intersection of the two strokes forming the cross can be moved in a vertical direction. Selection of the diode which is initially illuminated will control the position of the centre of the cross in a horizontal fashion. Thus by suitably controlling the initial selection of diode applied to prism 4 and the diode selected to be applied to the input of optical combiner 7', a cross can be produced whose intersection lies anywhere within the field of the device, which field is effectively N lines square where N is the number of diodes in the array. This is represented by the diagram in FIG. 2 which considers the case of an array of 25 diodes. The field of coverage is represented by the area enclosed within the broken line 9. The cross made up of the vertical line 10 and the horizontal line 11 is formed by first illuminating the eleventh diode in the array, here referenced 12, and subsequently illuminating the fifteenth diode, here referenced 13, in the array after rotating mirror 2 has scanned light across the input face of right-angled prism 4 and before it scans light across the input face of the optical combiner 7'.

FIG. 3 is a timing diagram for the system.

From the point of view of a satisfactory persistance effect in order to give the appearance of a continuous cross, the light should be scanned at approximately 20 times per second. From FIG. 3 this implies a mirror rotation speed of 600 rpm, although the precise speed of rotation is not crucial to the operation of the system.

Referring to FIG. 4 this diagrammatically represents the composition of the LED array 1 of FIG. 1. The diodes are formed as known per se in a strip 14 consisting in practice of up to 400 individual diodes. A power supply (not shown) is connected to terminal 15 to supply the diodes with operating current. A shift register 16, controlled by a clock (not shown in FIG. 4), connected to terminal 17 acts to select via driver circuits represented within block 18 which of the individual diodes in the strip 14 are energised. Normally in order to obtain as thin a stroke as possible in forming the cross, only one diode will be energised at any one time.

It will be appreciated that the number of pulses which must be applied to the shift register 16 in the time interval between "painting" the vertical and horizontal strokes of the cross corresponds to the number of diodes in the strip 14. If a maximum aperture of 60° is assumed for the optical components 4 and 7, the period for diode selection (referring to FIG. 3) corresponds to 15° of rotation of the mirror 2. At a speed of 600 rpm this corresponds to a time interval of 4 mS implying (assuming 400 diodes in the strip 14) a maximum shift register clock rate of 100 kHz. This clock rate is well within the capabilities of chips currently commercially available for embodying register 16.

Referring to FIG. 5 the electronic control circuit represented therein consists of a "light chopper" in the form of a disc 19 having alternate portions which are light transmissive and light obstructive. The disc is mounted to rotate with the double-sided mirror 2 of FIG. 1 and so as to interrupt light directed through the disc from a light source (not shown) to a photodetector 20. Thus the output of photodetector 20 will be alternating current the frequency of which is determined by the rotational speed of the mirror 2.

The output of photodetector 2 is applied to a synchronising signal generator 21 which provides synchronising signals for the system.

Signals from a data input terminal 22 are applied to an external interface circuit 23 which decodes data signals appearing on terminal 22 and relating to the desired position of the centre of the cross to be generated at the output 8 of the optical combiner 7'' of FIG. 1. External interface circuit 23 is connected to load decoded signals into separate stores for the horizontal and vertical coordinates of the intersection of the cross. The vertical address store is referenced 24 and the horizontal address store is referenced 25. At the appropriate time, as defined by the synchronising circuit 21, as appropriate either the vertical or the horizontal address stored in store 24, 25 is loaded into a counter 26 a clock generator for which is represented at 27. From counter 26 the appropriate number of pulses is counted out and applied to terminal 17 of shift register 16 of the diode array arrangement shown in FIG. 4 and represented in FIG. 5 by the block referenced 27. The selected diode is then turned on and the respective stroke of the cross is swept out by rotation of the mirror, as has already been described.

The power supply for the system is represented by the block 28 which is connected to derive input via protection circuits 29, as known per se, from an external power supply terminal 30.

Rotational drive for the mirror assembly 2 is provided for by a motor 31 which derives power from the power supply 28 via motor drive circuits 32, as known per se.

The motor 31 may be a dc motor, a single phase induction motor or a stepper motor. In the last two cases the motor drive circuits 32 are synchronised to the clock generator 27 as represented by the dashed line 33.

I claim:

1. A system comprising a sight into the field of which a position indicating mark in the form of a cross is required to be injected the means for generating said mark comprising a linear array of light sources, reflector means rotatable about an axis and arranged to reflect an image of said array in the course of rotation towards a first light transmissive member and thereafter towards a second light transmissive member such that said image scans across the field of each light transmissive member in turn, means for relatively rotating the image passing through one light transmissive member relative to the image passing through the other light transmissive members, means for optically combining the output of the two light transmissive members and means for selectively energising individual ones of said light sources whereby said optical combining means produces a mark consisting of two crossing strokes the first of which is derived from the image of an illuminated light source scanned across the field of said first light transmissive member and the other of which is derived from the image of a light source scanned across the field of said second light transmissive member.

2. A system as claimed in claim 1 and wherein said means for relatively rotating the image passing through one light transmissive member relative to the image passing through the other light transmissive member is such as to provide a relative rotation of 90° whereby said two strokes produced by said optical combining means cross each other at right angles.

3. A system as claimed in claim 1 or 2 and wherein the axis of rotation of said reflector means is parallel to the direction of extension of said linear array of light sources.

4. A system as claimed in claim 1 or 2 and wherein said first light transmissive member comprises a right-angled prism arranged to direct light from said reflector means to an optical system consisting of two right-angled prisms with their reflective surfaces perpendicular which both effect said reflective rotation of 90° and directs light on to said optical combining means.

5. A system as claimed in claim 1 or 2 and wherein said second light transmissive member comprises a rhomboid prism the output face of which is in contact with a cubical light transmissive member ating as said optical combining means.

6. A system as claimed in claim 1 or 2 and wherein means are provided for selectively energising a number of light sources in said array during the time when said image is scanned across the field of said first light transmissive member and for selectively energising a number of said individual light sources during the time when said image is scanned across the field of said second light transmissive member.

7. A system as claimed in claim 6 and wherein said last mentioned number is in each case one only at any one time.

8. A system as claimed in claim 7 and wherein the arrangement is such that one light source may be energised during the time when said image is scanned across the field of said first light transmissive member and a different light source may be energised during the time when said image scans across the field of said second light transmissive member whereby the crossing point of the mark produced by said optical combining means may be controlled as to its position within the field of said last mentioned means.

9. A system as claimed in claim 1 or 2 and wherein said light sources are LED's (light emitting diodes).

10. A system as claimed in claim 1 or 2 and wherein said rotatable reflector means comprises a double-sided mirror.

* * * * *